United States Patent [19]

Teraslinna et al.

[11] Patent Number: 4,991,171

[45] Date of Patent: Feb. 5, 1991

[54] BROADCAST PACKET SWITCH NETWORK

[75] Inventors: Kari T. Teraslinna, Naperville; Wing N. Toy, Glen Ellyn, both of Ill.

[73] Assignee: AT&T Bell Laboratories, Murray Hill, N.J.

[21] Appl. No.: 412,952

[22] Filed: Sep. 26, 1989

[51] Int. Cl.$^5$ .............................................. H04J 3/08
[52] U.S. Cl. .............................. 370/94.1; 340/825.52
[58] Field of Search ........................ 370/53, 60, 94.1; 340/825.52, 825.53

[56] References Cited

U.S. PATENT DOCUMENTS

| | | | |
|---|---|---|---|
| 4,651,318 | 3/1987 | Luderer | 370/94 |
| 4,701,906 | 10/1987 | Ransom et al. | 370/60 |
| 4,734,907 | 3/1988 | Turner | 370/60 |
| 4,813,038 | 3/1989 | Lee | 370/94.1 |
| 4,914,654 | 4/1990 | Matsuda et al. | 370/94.1 |

OTHER PUBLICATIONS

J. S. Turner, "Design of a Broadcast Packet Switching Network", *IEEE Transactions on Communications*, vol. 36, No. 6, Jun. 1988, pp. 734–743.
H. Suzuki, "Output-Buffer Switch Architecture for Asynchronous Transfer Mode", *IEEE International Conference on Communications*, vol. 1, Jun. 11–14, 1989, pp. 4.1.1–4.1.5.
H. Kuwahara, "A Shared Buffer Memory Switch for an ATM Exchange", *IEEE International Conference on Communications*, vol. 1, Jun. 11–14, 1989, pp. 4.4.1–4.4.5.

*Primary Examiner*—Douglas W. Olms
*Assistant Examiner*—Una Kim
*Attorney, Agent, or Firm*—M. B. Johannesen

[57] ABSTRACT

A packet switching arrangement for receiving packets including broadcast addresses and connecting representations of the received packets to any combination of output ports specified in the address is disclosed. The packet routing units of the network both generate packet representations and selectively connect the representations to downstream routing units or network outputs. Packets for use with the network comprise an address portion encoded in a broadcast format or in a shorter point-to-point format and an address type character identifying the type of address in the address portion. The nodes of the network respond to the address type character of a received packet. By selecting the appropriate decoding format for the packet address portion, a packet select unit decodes the address portion in accordance with the selected encoding format and selectively connects the packet to the network outputs.

12 Claims, 6 Drawing Sheets

PACKET SELECT 220

PACKET SELECT

PACKET SELECT

PACKET SELECT

BROADCAST PACKET SWITCH NETWORK

CROSS-REFERENCE TO RELATED APPLICATION

This application is related to K. T. Teraslinna, Ser. No. 07/412,725, which is filed concurrently, herewith.

TECHNICAL FIELD

The present invention relates to packet switching networks having packet broadcast capabilities.

BACKGROUND OF THE INVENTION

The usefulness of packet switching networks for the transmission of digital information, particularly burst type information, has long been recognized. Such networks are generally point-to-point in nature in that a packet from a single source is directed to a single destination by an address attached to the packet. The network responds to the packet address by connecting the packet to the appropriate destination.

Packet switching networks are also used which combine burst type data with the more continuous types of information such as voice, high quality audio, and motion video. Commercialization of voice, video and audio transmission makes it desirable to be able to connect packets to multiple destinations, called packet broadcasting. For example, a broadcast video service such as pay-per-view television involves a single source of video packets, each of which is directed to multiple video receivers. Similarly, conferencing capabilities for voice communication also require single source to multiple destination transmission.

One prior packet broadcast arrangement such as that shown in J. S. Turner, U.S. Pat. No. 4,734,907, Mar. 29, 1988, comprises a network consisting of a packet duplication arrangement followed by a packet routing arrangement. As a broadcast packet enters this network, packet copies are made in the packet duplicating arrangement until as many copies exist as there are destinations for the packet. A translation table look up is then performed at the duplication arrangement outputs for each of the packet copies to provide a different, single destination address for each copy. All of the packet copies with their new packet addresses are then applied to the packet routing arrangement, which connects them to the appropriate network output ports.

Problems exist with this prior packet broadcast arrangement. First, a separate packet duplication arrangement must be provided prior to the routing arrangement which adds to the expense and complexity of the network and which sends multiple packet copies to the inputs of the routing arrangement. Sending multiple copies to the routing network inputs (as opposed to sending a single packet which is duplicated by the routing arrangement) increases the total bandwidth which must be provided within the routing arrangement. Another problem with this prior network is that each of the duplication arrangement output ports requires a translation table which must be consulted each time a broadcast packet occurs and must be frequently updated. Throughout a large network, maintaining the consistency of the translation table data, especially when packet destinations are added or deleted, is complex.

Another prior packet broadcast arrangement is described in M. N. Ransom et al., U.S. Pat. No. 4,701,906, issued October 20, 1987. The Ransom et al., arrangement affixes to each incoming packet an address which is capable of directing the packet to multiple, but not all combinations of network destinations. This network avoids the use of a separate duplication arrangement but many combinations of outputs cannot be reached by incoming packets. This problem limits the usefulness of the network for commercial applications.

SUMMARY OF THE INVENTION

The foregoing problems are solved and a technical advance is achieved in accordance with the present invention in which a packet address capable of defining all possible combinations of network output ports is affixed to each broadcast packet at the network inputs and the packet routing stages of the network respond to the affixed address by generating representations of the original packet and connecting the representations to the output ports defined by the affixed address. An illustrative network of the present invention is capable of routing packets to all combinations of outputs and avoids the separate copy arrangements and the difficult translation table update arrangements of prior systems.

In an embodiment of the invention the address affixed to each packet comprises a bit map having a number of bit positions equal to the total number of network output ports, where each bit position corresponds to a different network output port. Each bit position corresponding to an output port which is to receive the packet, is set to one binary value, e.g. "1" while the bit positions corresponding to the other network output ports are set to the other binary value, e.g., "0". Each stage of the packet switching network responds to portions of the affixed bit map packet address to connect representations of the packet to a downstream stage or the appropriate network output ports.

A network in accordance with one aspect of the invention comprises a plurality of output nodes, each comprising predetermined network output ports and an intermediate switch stage. The intermediate switch stage responds to the address of a received packet by connecting packet representations only to the output nodes comprising a destination output port for the packet. The output nodes respond to the bit map address of the packet representation they receive by selectively connecting the packet representation to the destination output ports.

The bit map address comprises a plurality of groups of bit positions with a different group corresponding to each of the output nodes. The intermediate stage responds to the groups of bit positions by connecting a packet representation to each output node corresponding to a group including at least one bit of the one binary value.

Arrangements for reducing the address size required to specify all combinations of output ports are also employed. In one such arrangement, each address portion comprises two address fields. A first field is interpreted by a stage of the network to create and direct packet representations to only those output stage nodes which are connected to appropriate destination output ports. The output stage nodes interpret the second field of the address to connect the packet to the appropriate output ports.

Advantageously, the first address field is a bit map of the output nodes and the second address field comprises one bit map for each output node which is identified by the first field to receive a packet representation. The intermediate stage interprets the first field bit map in a simple and straight forward manner to distribute packet representations to the output nodes. Each output node receiving a packet representation selects one of the second field bit maps to identify the ones of its output port which are to receive the packet. An output node selects the particular second field bit map in response to the first address field.

Another embodiment of the invention reduces the number of address bits transmitted in the network by deleting unnecessary bits from the packet addresses transmitted from the nodes of one stage to the nodes of a subsequent stage. This substantially reduces the number of address bits transmitted between successive network stages.

DETAILED DESCRIPTION

Figure 1:
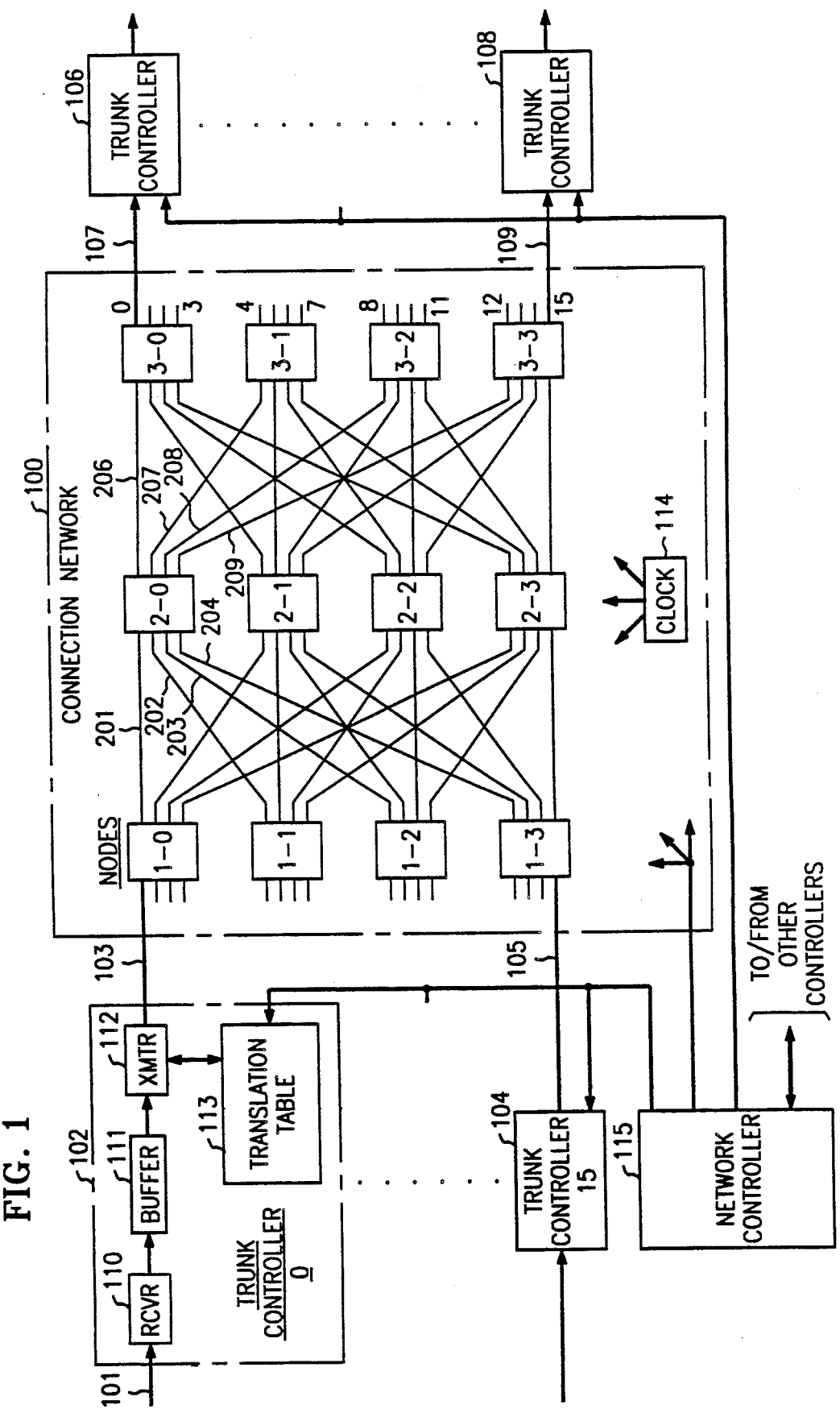
FIG. 1 is a block diagram of an exemplary packet switching arrangement.

FIG. 1 is a block diagram of a packet switching network comprising a connection network 100 having 16 input and 16 output ports. Each input port is connected to an incoming communication line, e.g., 101 via an individual input trunk controller, e.g. 102, 104 and each output port is connected to an individual output trunk controller of which trunk controllers 106 and 108 are specifically shown. Inputs to trunk controllers 102 through 104 and outputs of the trunk controllers 106 through 108 are conveyed at the rate of 45 Mbits per second.

Figure 2:
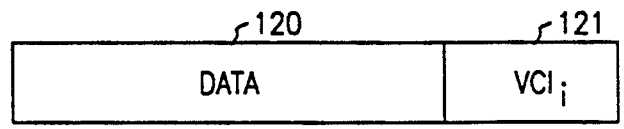
FIGS. 2 and 3 show packets received by and transmitted from, respectively, the trunk controllers of FIG. 1.
Figure 3:
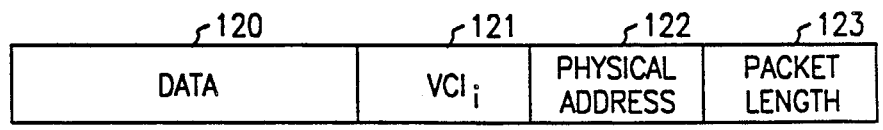

Input trunk controllers, e.g., 102 receive packets of the type shown in FIG. 2 which comprise a data portion 120 and a virtual channel identifier portion 121. Trunk controller 102 includes a receiver 110 which receives packets from line 101 and stores received packets in a first-in/first-out buffer 111. A transmitter 112 reads packets from buffer 111, reformats the packets to include a network physical address 122 (FIG. 3) and packet length variable 123 and sends the formatted packet to the network 100 in 8-bit blocks, via 8-bit positions of a 9-bit parallel path 103. The 9th-bit of the 9-bit parallel path 103 is used to convey a packet start bit at the beginning of each transmitted packet.

When a packet is read from buffer 111 by transmitter 112 the virtual channel identifier 121 (FIG. 2) is used to access a translation table 113 to obtain the network physical address 122 associated with the virtual channel identity. Transmitter 112 also computes the packet length in 8-bit bytes and appends the 16-bit physical address 122 (FIG. 3) and an 8-bit packet length variable 123 to the data portion 120. The physical address 122 is used by connection network 100 to select the one or more output ports which receive the packet.

The translation table 113 of each trunk controller is connected to a network controller 115 which maintains the translation tables. Network controller 115 receives requests for connections from other network controllers (not shown) associated with other switching networks, specifying the virtual channel identifiers of incoming packets and the destination outputs for packets including each virtual channel identifier. Network controller 115 responds to the requests by calculating the physical address needed to satisfy the request and storing the calculated physical address and virtual channel identifier in translation table, e.g., 113.

Connection network 100 is comprised of twelve 4-by 4 switching nodes arranged in three stages. Stage 1 comprises nodes 1-0 though 1-3, stage 2 comprises nodes 2-0 through 2-3 and stage 3 comprises nodes 3-0 through 3-3. Stage 1 is a distribution stage which does not duplicate packets but merely distributes the packets received at each input port over the nodes of the center stage 2 as is well-known in the art. Center stage 2 interprets the physical address 122 of the packets, replicates packets as needed and conveys them to the nodes of output stage 3. Each of the stage 3 nodes 3-0 through 3-3 replicates packets it receives, as needed, and connects them to output ports identified by the physical address.

Figure 4:
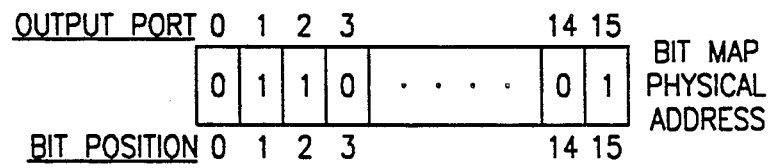
FIG. 4 shows a bit map physical address for use in the packet of FIG. 3.

The physical address 122 of packets in the present example is a bit map of the output ports. The bit map physical address, which is shown in FIG. 4, comprises 16-bit positions with a different position corresponding to each of the 16 output ports shown in FIG. 1 as 0 through 15. A "1" in a given bit position indicates that the packet is to be sent to the corresponding output port. The bit positions of the bit map are arranged so that bit positions 0 through 3 correspond respectively to output 0 through 3 of node 3-0, bit positions 4 though 7 correspond to outputs 4 through 7 of node 3-1. Bit positions 8 through 11 correspond respectively to outputs 8 though 11 of node 3-2 and bit positions 12 through 15 correspond respectively to output 12 through 15 of node 3-3. The center stage nodes, e.g., 2-0 interpret the bit positions in groups of four to determine the appropriate output node, e.g., 3-0 for each packet and each output stage node, e.g., 3-0 interprets the individual bits of the group corresponding to its output ports to select destination output ports.

Figure 5:
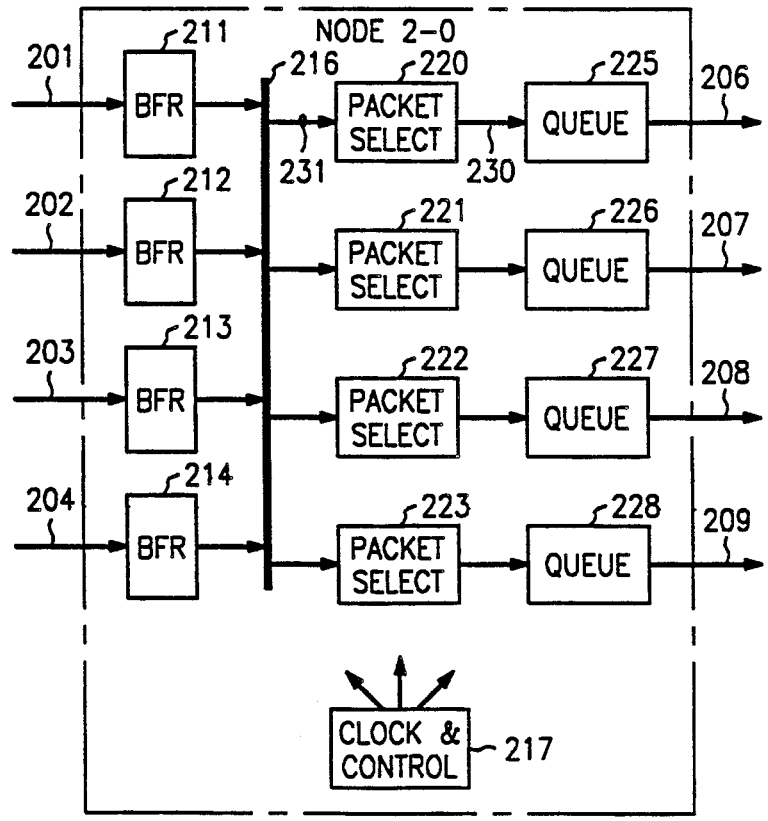
FIG. 5 is a block diagram showing the nodes of FIG. 1 in greater detail.

The node 2-0 shown in FIG. 5 represents all of the stage 2 and stage 3 nodes of the network. The FIG. 5 node, comprises four inputs 201 through 204 for nine parallel digits and four outputs 206 through 209 also for nine parallel digits. Each input, e.g., 201 is connected to a packet buffer 211 for receiving and buffering incoming packets. The node also includes a 9-bit bus 216 which is connected in parallel with all of the input buffers 211 through 214. A clock and control circuit 217 periodically polls each of the input buffers individually. A buffer which has accumulated an entire packet transmits the information in that packet in 8-bit bytes to the bus 216 upon being polled. Packets are transmitted on bus 216 at the rate of 250 Mbits per second which is somewhat faster than five times the individual incoming rate of 45 Mbits per second. The rate on bus 216 should be chosen to exceed four times the input bit rate so that all buffers can transmit a packet on bus 216 in less than or equal to the time required for receiving a packet. After one buffer has finished transmitting a packet it relinquishes the bus and another buffer is polled in a predetermined sequence.

Information transmitted on bus 216 is applied in parallel to four packet select units 220 through 223 each of which is respectively associated with a node output 206 through 209. in FIG. 5 packet select 220 is connected to bus 216 by a 9-bit parallel path 231. Each packet select unit determines from the packet address whether its associated output port is to receive the packet on the bus and store the packet in an associated one of packet queues 225 through 228. Packet select unit 220 is connected to queue 225 by a bus 230. The node presents each incoming packet substantially simultaneously to the packet selectors and permits the packet to be selected and held for one or more node outputs depending on the packet address. Each queue 225 through 228 includes a packet transmit unit (not shown) which reads packets in 8-bit bytes from its queue and transmits the bytes so read to a downstream node or output trunk controller, e.g., 106 at the rate of 45 Mbits per second.

Figure 6:
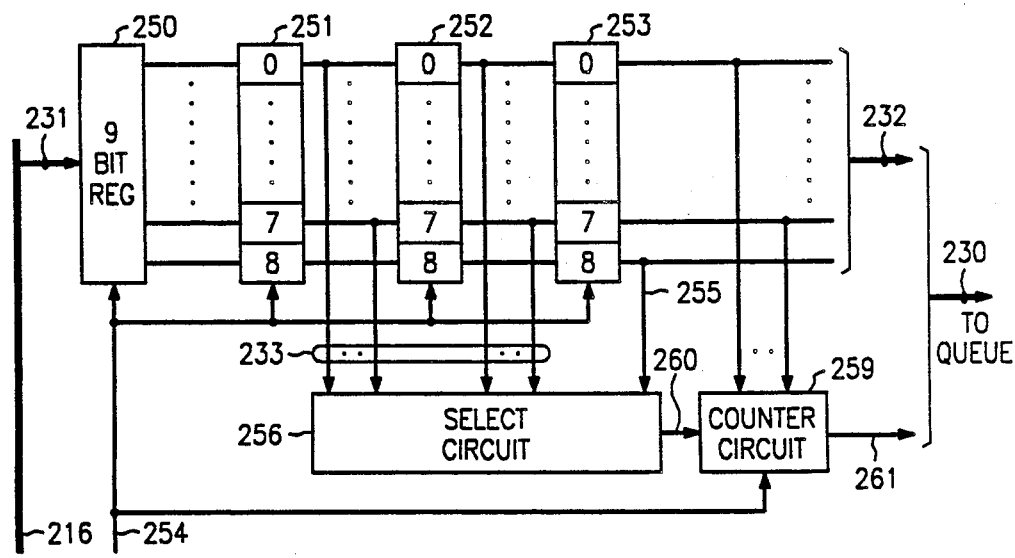
FIG. 6 is a block diagram of representative packet select unit.

FIG. 6 represents a packet select unit as used in stages 2 and 3 of the network of FIG. 1. Bus 216 is 9-bits wide, eight of which are used to convey data bits and the ninth is used to signal the start of a packet to the packet selectors 220 through 223(FIG. 5). When a buffer, e.g., 211 begins to transmit a packet on bus 216 it places "1" start bit in the 9th-bit position of bus 216 during the first packet byte. All other bytes of the packet include a "0" 9th-bit. Clock and control circuit 217 applies receive clock signals, which are synchronized with the transmission of packet bytes, to a conductor 254 of each of the packet select circuits 220 through 223. Within each packet select circuit, e.g., 220 the receive clock signals are applied to four 9-bit registers 250 through 253. One receive clock signal occurs during each byte applied to bus 216. The first receive clock signal gates the first packet byte from bus 216 into 9-bit register 250 via path 231. The second receive clock signal gates the contents of register 250 to register 251 and loads the 2nd-byte from bus 216 into register 250. After the fourth receive clock signal the first packet byte, including the "1" start bit, is in register 253, the 2nd-byte is in register 252, the third is in register 251 and the fourth is in register 250. The start bit in register 253 is applied via conductor 255 to a select circuit 256.

When select circuit 256 receives a "1" start bit on conductor 255, registers 251 and 252 in combination contain the bit map address of the incoming packet and register 253 contains the 8-bit packet length variable. Select circuit 256 receives the bit map address on conductor 233 and responds to the "1" start bit on conductor 255 by decoding the bit map. A "1" is applied by select circuit 256 to a counter circuit 259 via conductor 260 when the bit map defines the node output associated with the select circuit. A "1" on conductor 260 indicates that the received packet is for the associated node output.

Counter circuit 259 responds to the "1" input from conductor 260 by storing the packet length variable 123 (FIG. 3) which is then contained by the 8-bit byte in register 253. Counter circuit 259 also receives the clock signals on conductor 254. At each pulse received on conductor 254 while counter circuit 259 contains a value greater than 0, counter circuit 259 transmits a write pulse on conductor 261, which is a part of bus 230, to the associated queue 225 then decrements by 1 the value stored in the counter. The write pulses on conductor 261 begin when a packet for queue 225 is detected and as many write pulses are sent to queue 225 as there are bytes in the packet as indicated by the packet length variable. The outputs of register 253 are applied to queue 225 via a 9-bit conductor 232 which is a part of bus 230. Queue 225 responds to the write pulses from counter circuit 259 by storing the bytes of the selected packet which are successively gated through register 253 to queue 225. The bytes of packets applied to bus 216 are always gated through register 253, but when a packet is not selected by select circuit 256, no write pulses are generated on conductor 261 and the bytes are not stored in the queue.

The above discussion of nodes shown in FIG. 5 and packet selectors shown in FIG. 6 represents all of the nodes and selectors in the present embodiment. The address decoding function performed by the selector circuits, however, depends upon the particular packet selector and node including the selector circuit.

Figure 7:
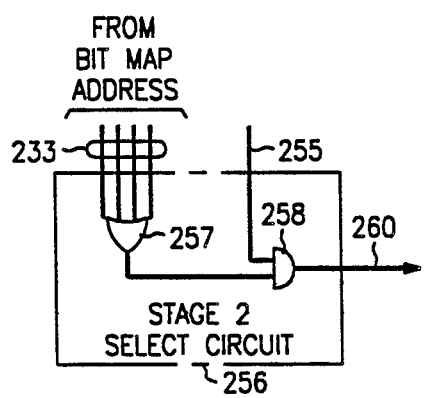
FIG. 7 shows a representative stage 2 select circuit.

The selector circuit in each stage 2 packet selector comprises a four input OR gate 257 and an AND gate 258 as shown in FIG. 7. OR gate 257 of packet select 220 receives as inputs over path 233 the 4-bit map address bits 0 through 3 from register 251 corresponding to the network output ports 0 through 3 reached via packet select 220. When any of these 4-bit map positions is a "1" OR gate 257 applies a "1" to AND gate 258. The "1" start bit on conductor 255 gates the output of OR gate 257 to conductor 260 resulting in the packet being stored in queue 225.

Packet select circuits 221 through 223 of stage 2 nodes are substantially identical to packet select circuit 220 except that their OR gate 257 is connected by path 233 to receive different parts of the bit map address. In packet select 221 OR gate 257 receives the second 4-bit map address bits, in packet select 222 OR gate 257 receives the third 4-bit map address bits from register 251 and in packet select 223 OR gate 257 receives the last 4-bits of the bit map address from register 251. All of the second stage nodes are identical to node 2-0.

Figure 8:
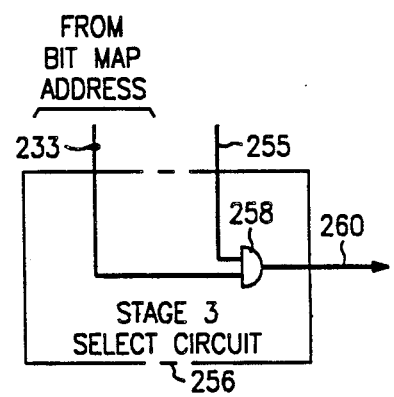
FIG. 8 shows a representative stage 3 select circuit.

The stage 3 nodes, 3-0 through 3-3, are substantially identical to the stage 2 nodes 2-0 through 2-3, except that the address decoding within the select circuits 256 is different. Each stage 3 packet selector is uniquely associated with one output port. By the nature of the bit map address (FIG. 4) a packet is identified as destined for a particular output port by the value of the bit map digit corresponding to that output port. For example, the stage 3 packet selector associated with the first output port 0 need only interpret the first bit position 0 of the bit map address. When the first bit position is a "1" the packet is for the first output port and when it is a "0" the packet is not destined for the first output port. FIG. 8 represents a stage 3 select circuit 256 in which packet decoding is carried out by a single AND gate 258 which receives, as inputs, the packet start bit on conductor 255 from register 253 and the first bit of the bit map address from register 252 over path 233. The select circuit of FIG. 8 represents the select circuit connected to network output port 0 and it interprets only the first bit of the bit map address. The other packet selectors connected to the other network output ports 1 through 15 include an AND gate 258 which is connected by path 233 to the bit map address bit position corresponding to its associated network output port.

The physical address of packets in the preceding example comprises 1-bit for each possible network of output port. Such an address and its transmission on all of the packet network links requires a certain amount of communication bandwidth. The following description relates to alternative embodiments which reduce the bandwidth required for physical address transmission in broadcast packet networks.

Figure 9:
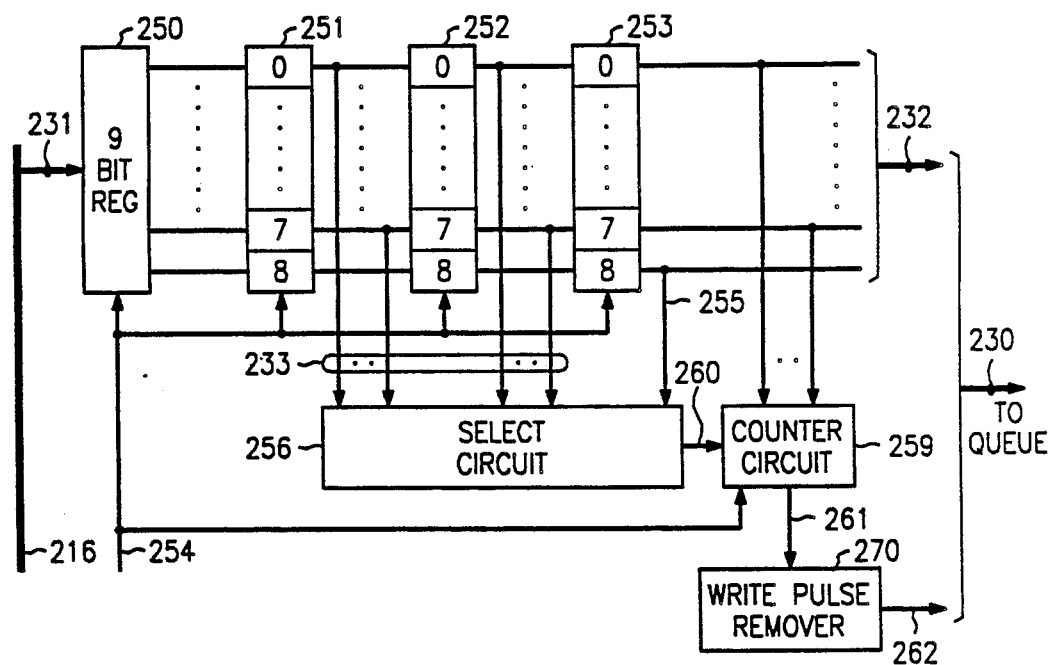
FIG. 9 is a block diagram of a packet select unit used to reduce the size of the packet address transmitted between network stages.

Address Bit Deletion FIG. 9

In the following embodiment, the bandwidth required to transmit broadcast physical addresses is reduced by deleting portions of the bit map address transmitted from stage 2 to stage 3. FIG. 9 represents a stage 2 packet select unit which is used to reduce the size of the physical address transmitted from stage 2 to stage 3. Select circuit 256 selects packets for storage in the associated queue as in the preceding embodiment. Bit map portions are deleted by inhibiting selected write pulses generated by counter circuit 259 after a packet is selected. FIG. 9 includes a write pulse removal circuit 270 which receives write pulses from counter circuit 259 on conductor 261 and deletes one selected write pulse from the write pulse string sent to queue 225 on conductor 262. The deletion of a write pulse causes the over writing of a byte in register 253 without storage of that byte in the queue and thus, the deletion of one byte from the packet.

Stage 3 nodes 3-0 and 3-1 respond only to the first and second 4-bit groups of the bit map address, respectively and do not use the 3rd and 4th 4-bit groups. Similarly, stage 3 nodes 3-2 and 3-3 respond only to the 3rd and 4th-bit groups of the bit map address, respectively and do no use the first and second 4- bit groups. In packet select units 220 and 221 the second 8-bits of the bit map address need not be sent to output nodes 3-0 and 3-1. In packet select unit 220 and 221 write pulse removal circuit 270 counts the first two write pulses from counter circuit 259 and inhibits the next write pulse (third) which occurs when the second 8-bit potion of the bit map address is in register 253. The absence of a write pulse causes the contents of register 253 to be overwritten without storage in the queue and thus deletes the byte from the packet.

In packet select units 222 and 223, the write pulse removal circuit 270 counts the first write pulse from circuit 259 and inhibits the second write pulse. The absence of a second write pulse deletes the first 8-bits of the bit map address from the packet before it is stored in the associated queue, e.g. 227.

Figure 10:
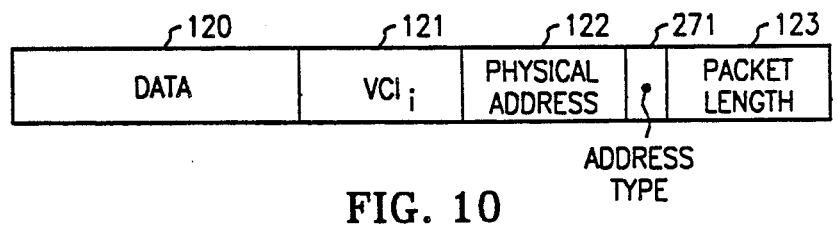
FIG. 10 shows a multiple address type packet format.
Figure 11:
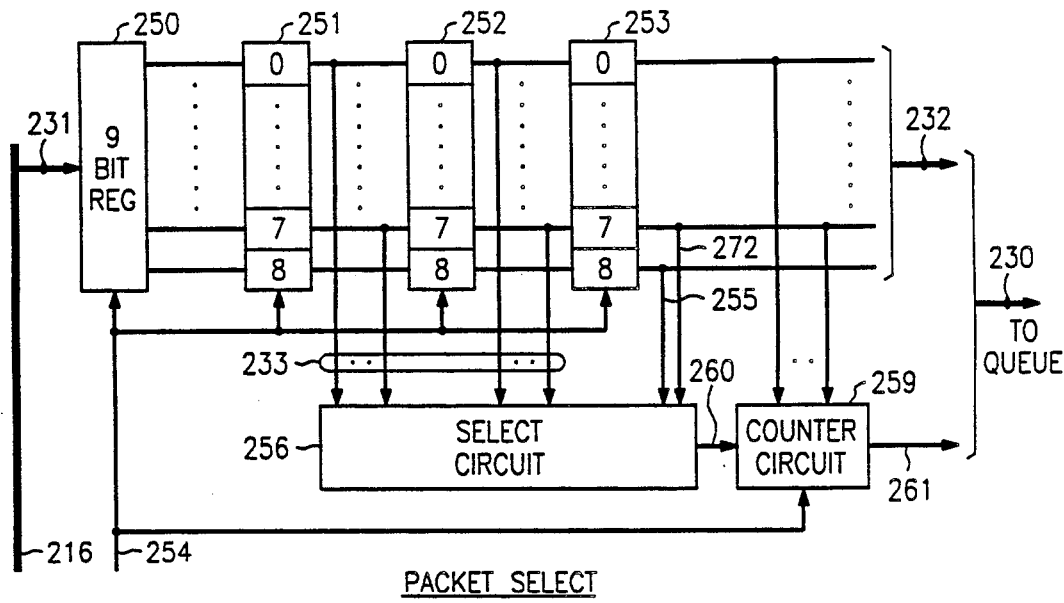
FIG. 11 shows a packet select unit for use with the packet shown in FIG. 10.
Figure 12:
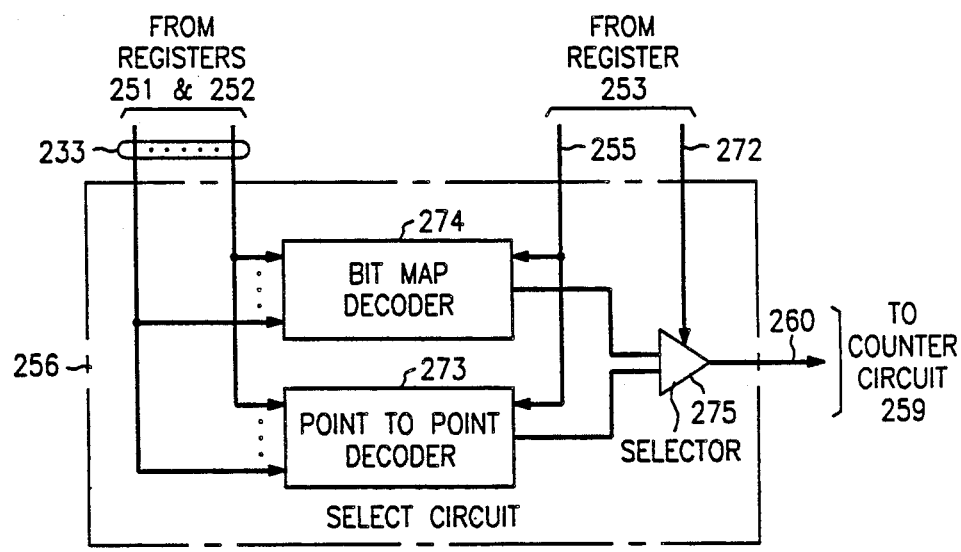
FIG. 12 shows a select circuit employed in the packet select unit of FIG. 11.

Multiple Address Types FIGS. 10, 11 and 12

A bit map address for a packet with a single destination comprises 16-bits in a network with 16 network output ports. A binary encoded point-to-point address designating a single network output port comprises only 4-bits as is well-known in the art. It has been found advantageous to provide binary encoded addresses with point-t-point packets and bit map addresses with broadcast packets. FIG. 10 shows a packet format for a network having a physical address field 122 which contains either a bit map address or a binary address and an address type character 271 which identifies the type of physical address included in the packet. In FIG. 10, the packet length variable 123 is 7-bits long and is followed by a one bit address type character 271 which identifies whether the physical address 122 is a bit map address or a binary encoded point-to-point address.

As previously described, the physical addresses are provided by translation table 113 (FIG. 1) in response to the virtual channel identifier of incoming packets. Each physical address is stored in translation table 113 by network controller 115 in response to a request for connection specifying the virtual channel to be used. Network controller 115 in the present arrangement responds to each request for connection by determining the type of packets, e.g., broadcast or point-to-point to be sent in the virtual channel which is the subject of the request. Network controller 115 then generates a physical address for packets which will satisfy the request. When the request is for a broadcast packet network controller 115 generates a bit map physical address of the type shown in FIG. 4. and stores that bit map address in translation table 113. Alternatively, when the request is for a point-to-point packet network controller 115 generates a binary address of the well-known type and stores that binary address in translation table 113.

The network operates as previously described with regards to FIGS. 1 through 6 except that packet select units, e.g., 220 selectively respond to the two different types of addresses. A packet select unit for use with packets of the dual address are applied to select circuit 256 via path 233 (FIG. 12). Packet select circuit of FIG. 12 is to be used with packets including either a point-to-point address or a bit map address. The select circuit comprises a first decoder 273 for binary addresses and a second decoder 274 for bit map addresses. When a new packet is indicated by the start bit on conductor 255 both decoders decode selected bit positions of the packet stored in registers 251 and 252. The address type bit (271, FIG. 10) is applied via conductor 272 to a selector 275 which gates the output of the bit map decoder to conductor 260 when conductor 272 conveys a "1", indicating a bit map address and gates the output of point-to-point decoder 273 to conductor 260 when conductor 272 conveys a "0" indicating a point-to-point address. Counter circuit 259 responds to a "1" selection signal on conductor 260 by generating write pulses on conductor 261 for storing the received packet in the associated queue, e.g., 225 as previously discussed.

The above embodiment shows an arrangement for selectively decoding point-to-point or bit map addresses. The arrangement can be extended to more than two address encoding formats by increasing the number of decoders in select circuit 256 and by providing a sufficient number of bits in the address type character 271 to identify the specific format used in the packet. Also the address encoding formats need not be bit map and point-to-point, but they can comprise any encoding formats. All that is required is that select circuit 256 be capable of performing the decoding functions defined by the address type character for each packet address.

Figure 13:
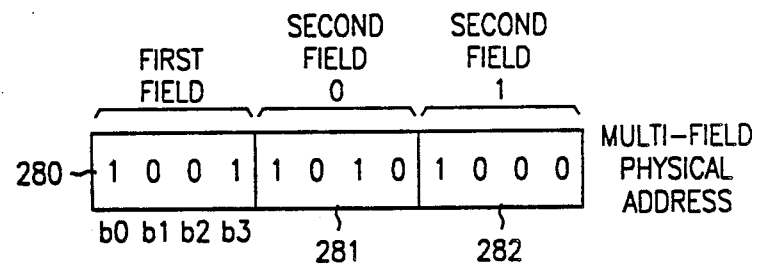
FIG. 13 shows the address portion for a two field alternative packet format.
Figure 14:
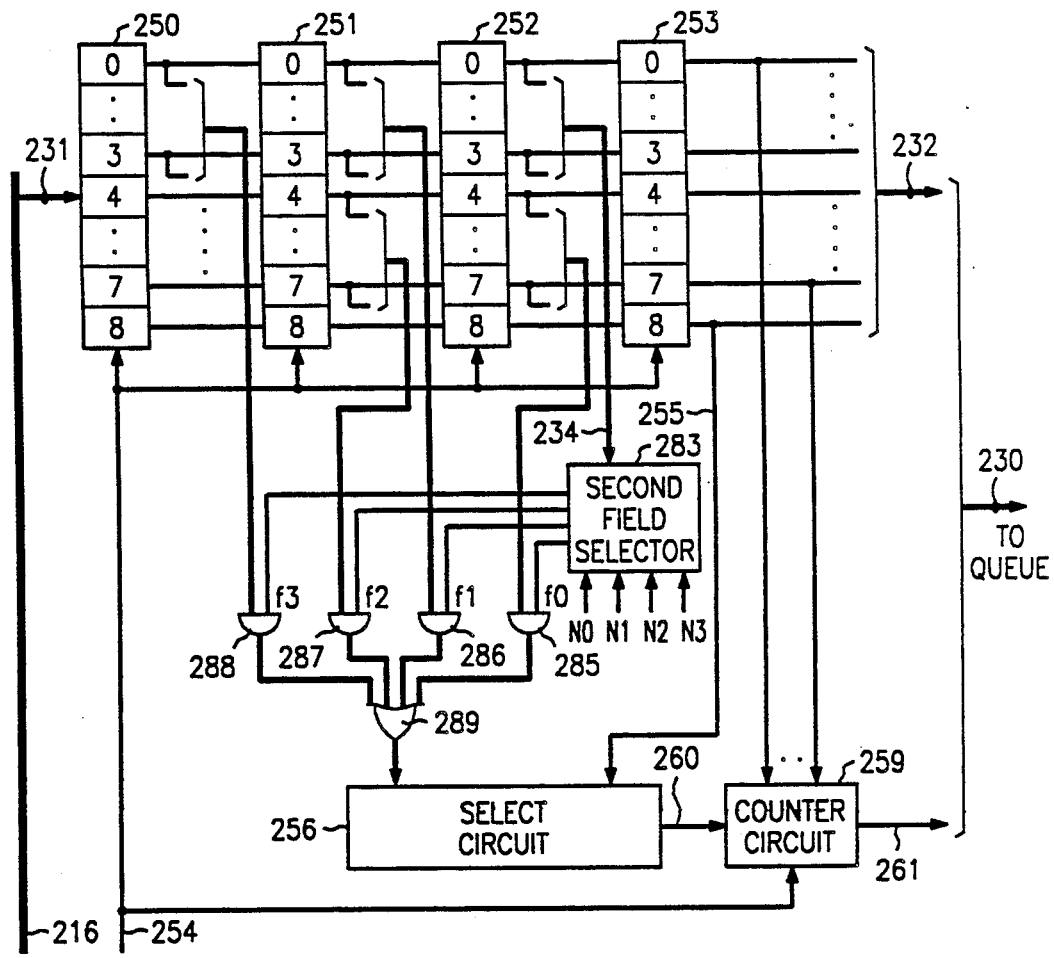
FIG. 14 is a block diagram of a packet select unit for use with the packet addresses of FIG. 13.

Two Field Addresses FIGS. 13 and 14

In an additional embodiment, the average packet address length can be shortened by using physical addresses comprising a first address field 280 (FIG. 13) identifying the output nodes, e.g., 3-0 which are to receive the packet and one or more second address fields, e.g., 281 and 282, one for each selected output node, defining the network output ports to receive the packet.

The first address field comprises a bit map of the output nodes and is interpreted by stage 2 nodes, e.g., 2-0. The 4-bit positions of the first address field are referred to as bits b0 through b3. The packet selectors 220 through 223 of a second stage node receiving the packet having a physical address shown in FIG. 13 interpret the "1001" first field and packet selectors 220 and 223 select the packet for the outputs 0 and 3 of the node corresponding the "1s" in bit positions b0 and b3 of the first field. This is standard bit map decoding as described previously with regard to FIG. 8.

Outputs 0 and 3 of each second stage node are connected to stage 3 nodes, 3-0 and 3-3 respectively, both of which receive the packet. Nodes 3-0 and 3-3 apply the packet to the four packet selectors of those nodes, as described, regarding FIG. 5. Each of the packet selectors in nodes 3-0 and 3-3 selects one of the two second fields 281 and 282 to identify which output ports are to receive the packet. FIG. 14 shows a stage 3 packet select unit which selects the appropriate second field and decodes it to select packets for the node output ports.

The packet select of FIG. 14 includes a second field select unit 283 which selects the appropriate second address field and generates a select signal on one of the outputs f0 through f3. The select signal enables one of four AND gates 285 through 288 to pass a selected second address field to select circuit 256 via an OR gate 289. Select circuit 256 decodes the 4-bit address field as described regarding the stage 3 select circuit of FIG. 8. It should be mentioned that although AND gates 285 through 288 and OR gate 289 are each shown as a single gate in FIG. 14 they are actually four gates, one for each bit of the second address field operating in parallel.

Second field select unit 283 receives as inputs the 4-bits (bits b0 through b3) of the first address field from register 252 on path 234 and a "1" on only one of four inputs N0 and N3. The signals on inputs N0 through N3 identify the particular node including the packet selector. For example, packet selectors of node 3-0 receive a single "1" on conductor N0 while the packet selectors of node 3-3 receive a single "1" on conductor N3. The signals are applied to inputs N0 through N3 by permanently connecting "1s" and "0s" to these inputs when the node is fabricated, as is well known in the art.

Generally stated, the second field select unit 283 selects an address field by knowing the correspondence of its node and the bit positions of of the first address field, by counting the number of "1s" in the first address field up through its corresponding bit position in the first address field and by selecting the second address field of the same number. For example, second field select unit 283 of node 3-3 knows that it corresponds to digit b3 of the first address field (due to a "1" on input N3) and selects the second of the second address fields (second field 1) since the "1" corresponding to node 3-3 is the second "1" in the first address field 280.

The Boolean equations specifying in the operation of second field select unit 283 are as follows:

$$f0 = b0 \cdot N0 + b1 \cdot \overline{b0} \cdot N1 + b2 \cdot \overline{b1} \cdot \overline{b0} \cdot N2 + b3 \cdot \overline{b2} \cdot \overline{b1} \cdot \overline{b0} \cdot N3, \quad (1)$$

$$f1 = b0 \cdot b1 \cdot N1 + (b1 \cdot \overline{b0} + \overline{b1} \cdot b0) \cdot b2 \cdot N2 + \quad (2)$$

$$(b2 \cdot \overline{b1} \cdot \overline{b0} + \overline{b2} \cdot b1 \cdot \overline{b0} + \overline{b2} \cdot \overline{b1} \cdot b0) \cdot b3 \cdot N3,$$

$$f2 = b0 \cdot b1 \cdot b2 \cdot N2 + (\overline{b3} \cdot b2 \cdot b1 \cdot b0 + b3 \cdot \overline{b2} \cdot b1 \cdot b0 + \quad (3)$$

$$b3 \cdot b2 \cdot \overline{b1} \cdot b0 + b3 \cdot b2 \cdot b1 \cdot \overline{b0}) \cdot b3 \cdot N3, \text{ and}$$

$$f3 = b0 \cdot b1 \cdot b2 \cdot b3 \cdot N3. \quad (4)$$

After the appropriate second address field is selected, select circuit 256 decodes it in the manner described with regard to FIG. 8 to identify if the received packet is destined for the associated output port. When the packet is selected, a "1" is applied to counter circuit 259 which responds by transmitting write pulses on conductor 261 to the associated queue.

We claim:

1. A packet switching system comprising:
   a network means comprising a plurality of output ports;
   input means responsive to a request for transmission of information to identified ones of said output ports for transmitting to said network means a packet comprising said information and an address comprising a plurality of bit positions, each of said bit positions corresponding to a different one of said output ports and having one binary value when the output port corresponding thereto is identified in said request and having the other binary value when the output port corresponding thereto is not identified; and
   said network means comprises connection means responsive to said address of a packet received from said input means for connecting representations of said received packet to the output ports identified in said request.

2. The network of claim 1 wherein said connection means comprises:
   a plurality of output nodes, each output node comprising predetermined ones of said output ports; and
   an intermediate packet switch stage responsive to said address of said received packet for connecting representations of said received packet only to the ones of said output nodes comprising said identified ones of said output ports.

3. The network of claim 2 comprising means in said intermediate packet switch stage for generating said representations of said received packet by deleting bit positions from said address in accordance with predetermined deletion criteria.

4. The network of claim 2 wherein said address comprises a plurality of groups of bit positions, a different group of bit positions corresponding to each of said output nodes; and
   said intermediate packet switch stage comprises means responsive to each of said groups of bit positions for connecting a representation of said received packet to each of said output nodes corresponding to a group of bit positions including a bit position of said one binary value.

5. The network of claim 4 comprising means in said intermediate packet switch stage for generating representations of said received packet by deleting groups of bit positions from said address in accordance with predetermined deletion criteria.

6. The network of claim 4 wherein said connected representations include said groups of bit positions and each of said output nodes is responsive to the group of bit positions corresponding thereto for connecting said information of said received packet to each output port corresponding to a bit position of said one binary value.

7. A packet switching network comprising:
 a plurality of output nodes, each comprising a predetermined plurality of output ports;
 means responsive to a request for transmission of information to identified ones of said output ports for generating a packet comprising said information and an address comprising a first address field specifying the ones of said output nodes comprising said identified output ports and a second address field specifying the identified output ports;
 means responsive to said first address field of a received packet for connecting a representation of said received packet only to said output nodes comprising said identified output ports; and
 each of said output nodes comprises means responsive to said second address field of a packet connected thereto for connecting representations of said packet connected thereto to the ones of said identified output ports comprised thereby.

8. The network of claim 7 wherein said second address field comprises a number of group of bit positions equal to the number of output nodes specified by said first address field, each of said groups of bit positions specifying the ones of said identified output ports on one of said output nodes, and each of said output nodes comprises means responsive to one of said groups of bit positions for connecting representations of a packet connected thereto selected ones of the output ports thereof.

9. The network of claim 8 wherein each of said output nodes comprises means for selecting one of said groups of bit positions.

10. The network of claim 8 wherein each of said output nodes comprises means responsive to said first address field for selecting one of said groups of bit positions.

11. A packet switching network comprising a plurality of output ports for selectively connecting an information packet, including an information portion and a destination address identifying one of said output ports, to said identified output port comprising:
 an output stage of output nodes, each output node comprising a predetermined plurality of said output ports;
 an intermediate network stage responsive to the destination address of said information packet for creating a representation of said information packet by deleting a part of said destination address and for connecting said representation to a selected one of said output nodes which comprises said identified output port; and
 means in said selected output node, responsive to the remaining part of said destination address, for connecting said information portion of said information packet to said identified output port.

12. A packet switching network comprising a plurality of output ports for selectively connecting ann information packet, including an information portion and a destination address identifying two of said output ports, to said identified output ports comprising:
 an output stage of output nodes, each output node comprising a predetermined plurality of said output ports;
 an intermediate network stage responsive to the destination address of said information packet for creating a first representation of said information packet by deleting a part of said destination address, for connecting said first representation to a first selected one of said output nodes which comprises a first one of said identified output ports, for creating a second representation of said information packet by deleting a part of said destination address, and for connecting said second representation to a second one of said output nodes which comprises the second one of said identified output ports; and
 means in said first and said second selected output nodes individually responsive to the remaining parts of the destination address for connecting said information portion of said information packet to said identified output ports.

* * * * *

UNITED STATES PATENT AND TRADEMARK OFFICE
CERTIFICATE OF CORRECTION

PATENT NO. : 4,991,171

DATED : February 5, 1991

INVENTOR(S) : K. T. Teraslinna, W. N. Toy

It is certified that error appears in the above-identified patent and that said Letters Patent is hereby corrected as shown below:

On the title page, before item [57] Abstract:

Attorney, Agent or Firm "M. B. Johannesen", should be --R. T. Watland, K. H. Samples, F. W. Padden--.

Column 11, line 26, "group" should be --groups--;

Column 12, line 18, "ann" should be --an--.

Signed and Sealed this

Thirtieth Day of June, 1992

Attest:

DOUGLAS B. COMER

*Attesting Officer*      *Acting Commissioner of Patents and Trademarks*